United States Patent
Kitanaka

(10) Patent No.: US 8,222,857 B2
(45) Date of Patent: Jul. 17, 2012

(54) MOTOR CONTROLLING DEVICE

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 372 days.

(21) Appl. No.: 12/674,059

(22) PCT Filed: Sep. 25, 2007

(86) PCT No.: PCT/JP2007/068575
§ 371 (c)(1),
(2), (4) Date: Feb. 18, 2010

(87) PCT Pub. No.: WO2009/040884
PCT Pub. Date: Apr. 2, 2009

(65) Prior Publication Data
US 2011/0043149 A1 Feb. 24, 2011

(51) Int. Cl.
*H02P 27/08* (2006.01)
*H02P 1/08* (2006.01)
*H02M 7/529* (2006.01)

(52) U.S. Cl. .................. 318/811; 318/802; 318/400.26; 318/722; 318/723; 363/41; 323/282

(58) Field of Classification Search .............. 318/400.26, 318/400.3, 722–724, 802, 811; 363/41, 141; 323/282
See application file for complete search history.

(56) References Cited

U.S. PATENT DOCUMENTS

| | | | | |
|---|---|---|---|---|
| 4,779,183 A * | 10/1988 | Mutoh et al. | ................ | 363/41 |
| 4,860,186 A * | 8/1989 | Maekawa et al. | ............... | 363/41 |
| 6,043,624 A * | 3/2000 | Masaki et al. | ................ | 318/723 |
| 6,225,774 B1 * | 5/2001 | Masaki et al. | ................ | 318/723 |
| 7,049,800 B2 * | 5/2006 | Huang et al. | ................ | 323/282 |
| 8,077,491 B2 * | 12/2011 | Yamasaki | ................ | 363/132 |
| 2004/0135564 A1 * | 7/2004 | Huang et al. | ................ | 323/282 |

(Continued)

FOREIGN PATENT DOCUMENTS

DE     44 26 764     2/1996

(Continued)

OTHER PUBLICATIONS

Extended Search Report from European Patent Office issued in corresponding European Patent Application No. 07828368.6 dated Feb. 17, 2011.

(Continued)

*Primary Examiner* — Paul Ip
(74) *Attorney, Agent, or Firm* — Buchanan Ingersoll & Rooney PC

(57) ABSTRACT

In a controlling device for a permanent magnet synchronous motor, an asynchronous pulse mode is switched to a synchronous pulse mode in a situation where a modulation factor has become equal to or larger than a first set value or in a situation where an inverter output frequency has become equal to or higher than a second set value. The synchronous pulse mode is switched to the asynchronous pulse mode in a situation where the modulation factor has become smaller than the first set value, and also, the inverter output frequency has become lower than the second set value. By setting the second set value so that the number of pulses included in a half cycle of an output voltage fundamental wave of the inverter is equal to or larger than a predetermined value, it is possible to inhibit current oscillations and torque ripples from occurring in the motor.

14 Claims, 5 Drawing Sheets

U.S. PATENT DOCUMENTS

| | | |
|---|---|---|
| 2005/0046369 A1 | 3/2005 | Koyayashi et al. |
| 2006/0043919 A1 | 3/2006 | Chen et al. |
| 2006/0049792 A1 | 3/2006 | Chen et al. |

FOREIGN PATENT DOCUMENTS

| | | |
|---|---|---|
| EP | 0 229 656 | 7/1987 |
| EP | 0 254 290 A2 | 1/1988 |
| JP | 07-227085 A | 8/1995 |
| JP | 09-261966 A | 10/1997 |
| JP | 2005-086920 A | 3/2005 |
| JP | 2005-137197 | 5/2005 |
| JP | 2006-081287 A | 3/2006 |
| RU | 1823119 | 6/1993 |
| RU | 2289197 | 12/2006 |

OTHER PUBLICATIONS

Office Action (Decision on Grant) dated Nov. 24, 2010, issued in the corresponding Russian Patent Application No. 2010116153, and an English Translation thereof.

International Search Report (PCT/ISA/210) for PCT/JP2007/068575 mailed Dec. 18, 2007.

Written Opinion (PCT/ISA/237) for PCT/JP2007/068575 mailed Dec. 18, 2007.

\* cited by examiner

MOTOR CONTROLLING DEVICE

TECHNICAL FIELD

The present invention relates to a motor controlling device that is suitable for controlling an alternating-current motor used for driving a railway electric car and, in particular, controlling a permanent magnet synchronous motor.

BACKGROUND ART

In recent years, in fields to which alternating-current motors are applied such as the fields of industrial machines, home electric appliances, automobiles, and the like, the number of examples in which a permanent magnet synchronous motor is driven and controlled by an inverter has increased so as to replace conventional methods in which an induction motor is driven and controlled by an inverter.

Permanent magnet synchronous motors are known as having higher efficiency than induction motors for, for example, the following reasons: permanent magnet synchronous motors do not need excitation currents because a magnetic flux is established by a permanent magnet; no secondary copper loss occurs in permanent magnet synchronous motors because no electric current flows into the rotor; permanent magnet synchronous motors are able to effectively obtain a torque by, in addition to a torque generated by a magnetic flux established by a permanent magnet, making use of a reluctance torque that utilizes a difference between magnetic resistances in the rotor. In recent years, applying permanent magnet synchronous motors to electric power converting apparatuses used for driving railway electric cars have also been considered.

Patent Document 1: Japanese Patent Application Laid-open No. H7-227085

DISCLOSURE OF INVENTION

Problem to be Solved by the Invention

One of the objects to be achieved while configuring a motor controlling device that drives and controls a permanent magnet synchronous motor is to address the issue of changes in the level of an inter-terminal voltage of the motor that occur during an endeavor to optimally control the permanent magnet synchronous motor. To optimally control the permanent magnet synchronous motor, for example, a maximum torque/current controlling method by which the maximum torque with respect to a certain level of electric current is generated or a maximum efficiency controlling method by which the efficiency of the motor is maintained at the maximum level may be used. These methods used for optimally controlling the permanent magnet synchronous motor are controlling methods by which the amplitude and the phase of the electric current applied to the motor are regulated so as to have optimal values that are stored in calculation formulae or stored in a table in advance. Because the specifics of these controlling methods are disclosed in various documents, the detailed explanation thereof will be omitted. When any one of these optimal controlling methods described above is used, because a torque component current (i.e., a q-axis current) and a magnetic flux component current (i.e., a d-axis current) are both regulated so that these currents each have an optimal value according to the rotation speed and the level of an output torque of the motor, an optimal interlinkage magnetic flux of the motor changes according to the rotation speed and the level of the output torque of the motor. As a result, the inter-terminal voltage of the motor (i.e., an inverter output voltage) greatly changes.

In contrast, in common practice, a motor controlling device that drives and controls a conventional induction motor performs a constant-torque operation while maintaining a secondary magnetic flux of the motor at a constant level until the speed reaches a base speed after the motor is started up. After the speed has become equal to or higher than the base speed, the motor controlling device performs a constant-electric-power operation by reducing the secondary magnetic flux in substantially inverse proportion to an increase in an inverter output frequency while fixing an inverter output voltage at the maximum value. As a result, while the speed is equal to or higher than the base speed, the inverter is operated in a so-called one-pulse mode in which the maximum output voltage is obtained. The same principle applies to usages of motors as power sources for apparatuses other than railway electric cars such as electric automobiles and to usages of motors in general industries. In other words, in a constant-electric-power operation range, the secondary magnetic flux is only configured so as to change in inverse proportion to the inverter output frequency, but is not configured so as to change according to the level of the output torque. Although it is possible to regulate the secondary magnetic flux according to the output torque, this method is not usually used because, as explained below, transient characteristics of the output torque deteriorate.

According to the operational principal of induction motors, a secondary magnetic flux is generated in an induction motor by inducing an electric current on the rotor side, while an electric current on the stator side (i.e., a primary electric current) and a slip frequency, which are controllable from the outside of the induction motor, are controlled so as to be at desired levels. This configuration is greatly different from the configuration of permanent magnet synchronous motors where a permanent magnet is embedded in a rotor so that a magnetic flux is established to begin with. In induction motors, the relationship between the primary electric current and the secondary magnetic flux is a relationship of a first-order delay having a second-order time constant that is made up of a secondary resistance and a secondary inductance. Thus, even if the primary electric current is changed so that the secondary magnetic flux is configured so as to change according to the level of the output torque, it takes a period of time (generally speaking, approximately 500 milliseconds in the examples of induction motors used for railway electric cars) corresponding to the second-order time constant before the secondary magnetic flux becomes stable at the desired value. During this period of time, the output torque is not stable. As a result, the torque overshoots or exhibits a tendency of oscillating, and transient responses of the torque thus deteriorate. For these reasons, the method by which the secondary magnetic flux is regulated according to the output torque is usually not used in induction motors.

In other words, in the motor controlling device that drives and controls a conventional induction motor, because the relationship between the rotation speed of the motor and the value of the secondary magnetic flux of the motor is determined in a one-to-one correspondence manner, the relationship between the rotation speed of the motor and the level of the inverter output voltage is also determined in a one-to-one correspondence manner. Also, when the speed is equal to or higher than the base speed, the secondary magnetic flux is reduced in such a manner that the inverter outputs the maximum voltage. Thus, the inverter output voltage is fixed at the maximum value regardless of the level of the output torque (for example, see Patent Document 1).

In a motor controlling device that drives and controls a permanent magnet synchronous motor, however, the relationship between the rotation speed of the motor and the level of the inverter output voltage changes according to the output torque. Thus, it is necessary to pay attention to this characteristic when a motor controlling device is configured.

As another issue different from the ones discussed above, the relationship between a switching frequency of a switching element included in an inverter used for driving a motor and the number of poles in the motor may be considered. Generally speaking, the voltage of a direct-current power source used as an input to an inverter for a railway electric car is approximately 1500 volts to 3000 volts and is very high. Thus, it is necessary to use a high-voltage-resistant switching element that is resistant to a voltage of 3300 volts to 6500 volts. However, such a high-voltage-resistant switching element has a large switching loss and a large conduction loss. As a result, in consideration of not using excessive cooling means (e.g., cooling devices, cooling fans) for the switching element, an acceptable level of switching frequency is approximately 1000 hertz at maximum. For example, this level of switching frequency is as low as one tenth to one twentieth of the switching frequency for a home electric appliance, an industrial-use inverter, or an electric automobile.

As for the number of poles in a permanent magnet synchronous motor driven by an inverter, six poles or eight poles are appropriate from the point of view of making the motor compact and lightweight. Because most conventional induction motors include four poles, the number of poles in a permanent magnet synchronous motor is 1.5 to 2 times larger than the number of poles in a conventional induction motor.

When the number of poles in a motor increases, the inverter output frequency corresponding to the same speed of a railway electric car increases in proportion to the increase in the number of poles. In the case where a conventional four-pole induction motor is replaced by, for example, an eight-pole permanent magnet synchronous motor, the maximum value of the inverter output frequency in an application to a commonly-used railway electric car (i.e., the inverter output frequency at a designed maximum speed of the railway electric car) is as high as approximately 300 hertz, which is a double of the maximum level when a conventional induction motor is used (i.e., 150 hertz). However, as explained above, the acceptable level for the maximum value of the switching frequency is approximately 1000 hertz, and it is not possible to increase the switching frequency to a level higher than that. Thus, for example, to regulate the level of the inverter output voltage (i.e., so as to be a value other than the maximum voltage) in the case where the inverter output frequency is around 300 hertz, which is the maximum value, because the switching frequency is approximately 1000 hertz at most, the number of pulses included in a half cycle of the inverter output voltage is around 3, which is a result obtained by dividing the carrier frequency (i.e., the switching frequency) by the inverter output frequency, and is extremely small. When the motor is driven in such a state, there will be situations in which the carrier frequency is not divisible by the inverter output frequency. In those situations, the number of pulses and the positions of the pulses that are included in a positive half cycle and in a negative half cycle of the inverter output voltage are imbalanced. As a result, positive/negative symmetricity of the voltage applied to the motor is lost, and noise and/or oscillations are caused by current oscillations and/or torque ripples occurring in the motor.

The motor controlling device that drives and controls a conventional induction motor operates, as explained above, in the one-pulse mode in which, while the speed is equal to or higher than the base speed, the inverter output voltage is constantly fixed at the maximum value regardless of the level of the output torque. As a result, there is no need to regulate the level of the inverter output voltage, and also, the number of pulses included in a half cycle of the inverter output voltage is always 1 and is constant without any temporal change. Consequently, the number of pulses and the positions of the pulses are equal between a positive half cycle and a negative half cycle of the inverter output voltage. Thus, it is possible to keep the positive/negative symmetricity of the voltage applied to the motor. Consequently, there is no need to worry about current oscillations or torque ripples occurring in the motor.

In other words, a motor controlling device for a railway electric car that drives and controls a permanent magnet synchronous motor needs to exercise control while sufficient attention is being paid to the positive/negative symmetricity of the voltage applied to the motor, especially in a range where the inverter output frequency is high.

To summarize, the motor controlling device for a railway electric car that drives and controls a permanent magnet synchronous motor needs to exercise control while sufficient attention is being paid to the changes in the level of the inter-terminal voltage of the motor based on the output torque and the rotation speed of the motor and to the positive/negative symmetricity of the voltage applied to the motor.

In view of the circumstances described above, it is an object of the present invention to provide a motor controlling device driving and controlling, in particular, a permanent magnet synchronous motor that is capable of exercising control while sufficient attention is being paid to the changes in the level of the inverter output voltage based on the output torque and the rotation speed of the motor and to the positive/negative symmetricity of the voltage applied to the motor, is capable of avoiding situations in which current oscillations and torque ripples occur in the motor, is therefore capable of avoiding situations in which noise and oscillations are caused by such current oscillations and torque ripples, and is also capable of driving and controlling the motor in a stable manner.

Means for Solving Problem

In order to solve the above problem, and to attain the above object, in a motor controlling device of the present invention that controls an alternating-current motor by outputting a pulse width modulation signal to a switching element included in an inverter that is connected to a direct-current power source and is operable to output an alternating current having an arbitrary frequency and an arbitrary voltage to the alternating-current motor, the motor controlling device includes a pulse mode controlling unit that is operable to selectively switch among a plurality of pulse modes each of which can serve as an output pattern of the pulse width modulation signal, and each of which includes a synchronous pulse mode, an asynchronous pulse mode, and a one-pulse mode. Additionally, the pulse mode controlling unit switches between the synchronous pulse mode and the asynchronous pulse mode based on a plurality quantities each of which is related to an output state of the inverter and each of which makes it possible to reference a number indicating how many pulses are included in a cycle of an output voltage fundamental wave of the inverter.

Effect of the Invention

According to an aspect of the present invention, during the switching process performed by the motor controlling device to switch between the synchronous pulse mode and the asynchronous pulse mode, the pulse mode is switched based on the plurality of quantities each of which is related to an output state of the inverter, the plurality of quantities including a quantity that makes it possible to reference the number of pulses included in the cycle of the output voltage fundamental wave of the inverter. With this arrangement, in the case where the level of the inverter output voltage changes according to the output torque and the rotation speed of the motor like in, for example, a permanent magnet synchronous motor, it is possible to keep the positive/negative symmetricity of the voltage by making the synchronous pulse mode selectable even in a situation where, according to the conventional controlling method, it is not possible to keep the positive/negative symmetricity of the voltage applied to the motor because the asynchronous pulse mode is selected. As a result, advantageous effects are achieved where it is possible to avoid situations in which current oscillations and torque ripples occur in the motor, to therefore avoid situations in which noise and oscillations are caused by such current oscillations and torque ripples, and to drive and control the motor in a stable manner.

EXPLANATIONS OF LETTERS OR NUMERALS

Figure 1:
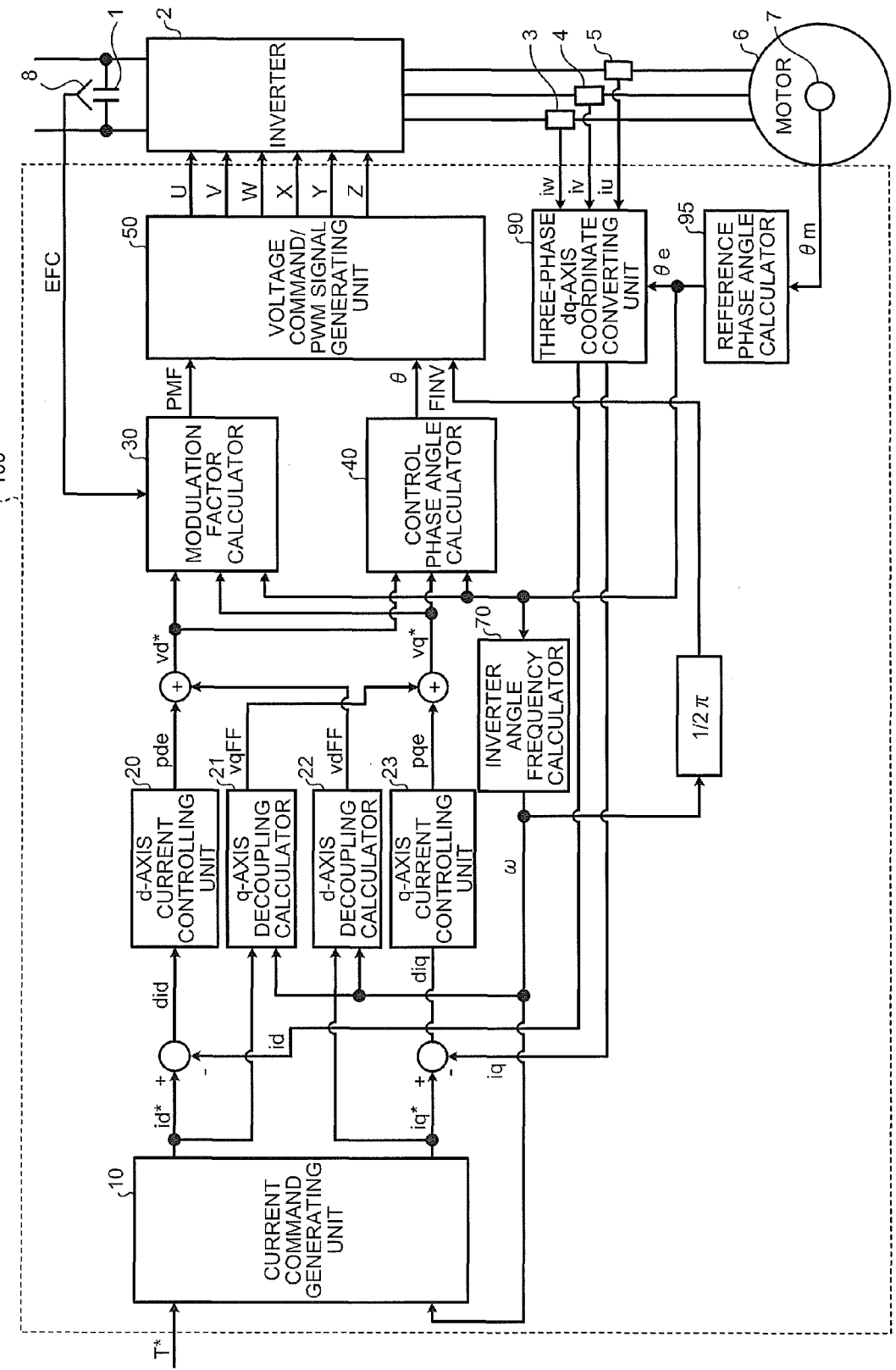
FIG. 1 is a diagram of an example of a motor controlling device according to a first embodiment of the present invention.

1: capacitor
2: inverter
3, 4, 5: current detector
8: voltage detector
10: current command generating unit
11: d-axis base current command generating unit
20: d-axis current controlling unit
21: q-axis decoupling calculator
22: d-axis decoupling calculator
23: q-axis current controlling unit
30: modulation factor calculator
40: control phase angle calculator
50: voltage command/PWM signal generating unit
53: multiplier
54: adjusted gain table
55: voltage command calculator
57: asynchronous carrier signal generating unit
58: synchronous three-pulse carrier signal generating unit
59: switch
60: pulse mode switching processing unit
61-63: comparator
64-66: inverting circuit
70: inverter angle frequency calculator
90: three-phase dq-axis coordinate converting unit
95: reference phase angle calculator
100: motor controlling device

BEST MODE(S) FOR CARRYING OUT THE INVENTION

In the following sections, exemplary embodiments of a motor controlling device according to the present invention will be explained in detail, with reference to the accompanying drawings. The present invention is not limited to the exemplary embodiments.

First Embodiment

FIG. 1 is a diagram of an example of a motor controlling device according to a first embodiment of the present invention. As shown in FIG. 1, a main circuit is configured so as to include: a capacitor 1 serving as a direct-current power source; an inverter 2 that converts a direct-current voltage from the capacitor 1 into an alternating-current voltage having an arbitrary frequency and an arbitrary voltage and outputs a three-phase alternating current; and a permanent magnet synchronous motor (hereinafter, simply referred to as a "motor") 6.

In the main circuit, a voltage detector 8 that detects the voltage of the capacitor 1 and current detectors 3, 4, and 5 that respectively detect electric currents iu, iv, and iw flowing in output lines from the inverter 2 are provided. The motor 6 is provided with a resolver 7 that detects a rotor mechanical angle θm. Detection signals from the voltage detector 8, the current detectors 3, 4, and 5, and the resolver 7 are input to a motor controlling device 100.

It is acceptable to use an encoder instead of the resolver 7. Also, instead of a position signal obtained from the resolver 7, it is acceptable to use a position sensorless method by which a position signal is obtained through a calculation based on the detected voltage, the detected currents, and the like. In this situation, there is no need to use the resolver 7. In other words, the position signal does not necessarily have to be obtained by using the resolver 7. In addition, with regard to the current detectors 3, 4, and 5, as long as current detectors are provided for at least two phases, it is possible to obtain the current for the other phase through a calculation. Thus, the circuit may be arranged in this manner. Yet another arrangement is acceptable in which the electric currents are obtained by reproducing an output current of the inverter 2 based on a direct-current side current of the inverter 2.

Gate signals U, V, W, X, Y, and Z that have been generated by the motor controlling device 100 are input to the inverter 2. A switching element that is provided within the inverter 2 is controlled through a Pulse Width Modulation (PWM) controlling process. A voltage-source PWM inverter is suitable for use as the inverter 2. Since configurations thereof are publicly known, detailed explanation thereof will be omitted.

The motor controlling device 100 is configured so that a torque command T* is input thereto from an external controlling device (not shown). The motor controlling device 100 is configured so as to control the inverter 2 in such a manner that a torque T generated by the motor 6 is equal to the torque command T*.

Next, a configuration of the motor controlling device 100 will be explained. The motor controlling device 100 is configured so as to include: a reference phase angle calculator 95 that calculates a reference phase angle θe based on the rotor mechanical angle θm; a three-phase dq-axis coordinate converting unit 90 that generates a d-axis current id and a q-axis current iq based on the three-phase currents iu, iv, and iw that have respectively been detected by the current detectors 3, 4, and 5 and the reference phase angle θe; an inverter angle frequency calculator 70 that calculates an inverter output angle frequency ω based on the reference phase angle θe; a current command generating unit 10 that generates a d-axis current command id* and a q-axis current command iq* based on the torque command T* that has been input from the external source and the inverter output angle frequency ω; a d-axis current controlling unit 20 that generates a d-axis current error pde by performing a proportional integral controlling process on a difference between the d-axis current command id* and the d-axis current; a q-axis current controlling unit 23 that generates a q-axis current error pqe by performing a proportional integral controlling process on a difference between the q-axis current command iq* and the q-axis current; a q-axis decoupling calculator 21 that calculates a q-axis feed forward voltage vqFF based on the d-axis current command id* and the inverter output angle frequency ω; a d-axis decoupling calculator 22 that calculates a d-axis feed forward voltage vdFF based on the q-axis current command iq* and the inverter output angle frequency ω; a modulation factor calculator 30 that calculates a modulation factor PMF, based on a d-axis voltage command vd*, which is a sum of the d-axis current error pde and the d-axis feed forward voltage vdFF, as well as a q-axis voltage command vq*, which is a sum of the q-axis current error pqe and the q-axis feed forward voltage vqFF, the reference phase angle θe, and a voltage EFC of the capacitor 1; a control phase angle calculator 40 that calculates a control phase angle θ, based on the d-axis voltage command vd*, which is the sum of the d-axis current error pde and the d-axis feed forward voltage vdFF, as well as the q-axis voltage command vq*, which is the sum of the q-axis current error pqe and the q-axis feed forward voltage vqFF, and the reference phase angle θe; and a voltage command/PWM signal generating unit 50 that generates the gate signals U, V, W, X, Y, and Z to be provided for the inverter 2, based on the modulation factor PMF and the control phase angle θ.

Next, detailed configurations and operations of the controlling blocks described above will be explained. First, the reference phase angle calculator 95 calculates the reference phase angle θe, which is an electrical angle, based on the rotor mechanical angle θm, by using Formula (1) shown below:

$$\theta e = \theta m \cdot PP \quad (1)$$

In Formula (1), PP represents the number of pole pairs in the motor 6.

The three-phase dq-axis coordinate converting unit 90 generates the d-axis current id and the q-axis current iq based on the three-phase currents iu, iv, and iw and the reference phase angle θe by using Formula (2) shown below:

$$\begin{pmatrix} iq \\ id \end{pmatrix} = \sqrt{\frac{2}{3}} \begin{pmatrix} \cos\theta_e & \cos\left(\theta_e - \frac{2}{3}\pi\right) & \cos\left(\theta_e + \frac{2}{3}\pi\right) \\ \sin\theta_e & \sin\left(\theta_e - \frac{2}{3}\pi\right) & \sin\left(\theta_e + \frac{2}{3}\pi\right) \end{pmatrix} \cdot \begin{pmatrix} iu \\ iv \\ iw \end{pmatrix}$$

The inverter angle frequency calculator 70 calculates the inverter output angle frequency ω by differentiating the reference phase angle θe by using Formula (3) shown below:

$$\omega = d\theta e/dt \quad (3)$$

Also, the inverter angle frequency calculator 70 calculates an inverter output frequency FINV by dividing the inverter output angle frequency ω by 2π.

Next, a configuration and operations of the current command generating unit 10 will be explained. The current command generating unit 10 generates the d-axis current command id* and the q-axis current command iq* based on the torque command T* that has been input from the external source and the inverter output angle frequency ω. The generating method may be, for example, an optimal controlling method such as the maximum torque/current controlling method by which the maximum torque with respect to a certain level of electric current is generated or the maximum efficiency controlling method by which the efficiency of the motor is maintained at the maximum level. According to these examples of the optimal controlling method, an actual current is regulated so as to be equal to optimal values of a torque component current command (i.e., the q-axis current command iq*) and a magnetic flux component current command (i.e., the d-axis current command id*) that are stored in calculation formulae or stored in a table in advance, while a rotation speed and a level of an output torque of the motor, for example, are used as parameters. Because the specifics of the optimal controlling methods are publicly known and are disclosed in various documents, the detailed explanation thereof will be omitted.

Next, the d-axis current controlling unit 20 and the q-axis current controlling unit 23 respectively generate the d-axis current error pde by performing a proportional integral amplification on the difference between the d-axis current command id* and the d-axis current and the q-axis current error pqe by performing a proportional integral amplification on the difference between the q-axis current command iq* and the q-axis current, by using Formulae (4) and (5) shown below:

$$pde = (K3 + K4/s) \cdot (id^* - id) \quad (4)$$

$$pqe = (K1 + K2/s) \cdot (iq^* - iq) \quad (5)$$

In Formulae (4) and (5), K1 and K3 each represent a proportional gain, whereas K2 and K4 each represent an integral gain, while s represents a differential operator. As additional information, the values of pqe and pde may be set to zero, as necessary, so that pqe and pde are not used in the controlling process, especially during the one-pulse mode operation or the like.

Further, the d-axis decoupling calculator 22 and the q-axis decoupling calculator 21 respectively calculate the d-axis feed forward voltage vdFF and the q-axis feed forward voltage vqFF, by using Formulae (6) and (7) shown below:

$$vdFF = (R1 + s \cdot Ld) \cdot id^* - \omega \cdot Lq \cdot iq^* \quad (6)$$

$$vqFF = (R1 + s \cdot Lq) \cdot iq^* + \omega \cdot (Ld \cdot id^* + \phi a) \quad (7)$$

In Formulae (6) and (7), R1 represents a primary winding resistance (Ω) of the motor 6, whereas Ld represents a d-axis inductance (H), while Lq represents a q-axis inductance (H), and φa represents a permanent magnet magnetic flux (Wb).

Further, the modulation factor calculator 30 calculates the modulation factor PMF, based on the d-axis voltage command vd*, which is the sum of the d-axis current error pde and the d-axis feed forward voltage vdFF, as well as the q-axis voltage command vq*, which is the sum of the q-axis current error pqe and the q-axis feed forward voltage vqFF, the reference phase angle θe, and the voltage EFC of the capacitor 1, by using Formula (8) shown below:

$$PMF=VM^*/VM\max \quad (8)$$

In relation to Formula (8), Formulae (9) and (10) shown below are satisfied:

$$VM\max=(\sqrt{6}/\pi)\cdot EFC \quad (9)$$

$$VM^*=\mathrm{sqrt}(vd^{*2}+vq^{*2}) \quad (10)$$

The modulation factor PMF is obtained by expressing a ratio of the magnitude VM* of an inverter output voltage command vector to the maximum voltage VMmax (defined by using Formula (9)) that is outputtable by the inverter. It is indicated that, in the case where PMF=1.0 is satisfied, the magnitude VM* of the inverter output voltage command vector is equal to the maximum voltage VMmax that is outputtable by the inverter. Also, as understood from Formulae (2) to (10), the modulation factor PMF changes according to the d-axis current command id* and the q-axis current command iq* that are generated by the current command generating unit 10.

The control phase angle calculator 40 calculates the control phase angle θ, based on the d-axis voltage command vd*, which is the sum of the d-axis current error pde and the d-axis feed forward voltage vdFF, as well as the q-axis voltage command vq*, which is the sum of the q-axis current error pqe and the q-axis feed forward voltage vqFF, and the reference phase angle θe, by using Formula (11) shown below:

$$\theta=\theta e+\pi+THV \quad (11)$$

In relation to Formula (11), Formula (12) shown below is satisfied:

$$THV=\tan^{-1}(vd^*/vq) \quad (12)$$

Figure 2:
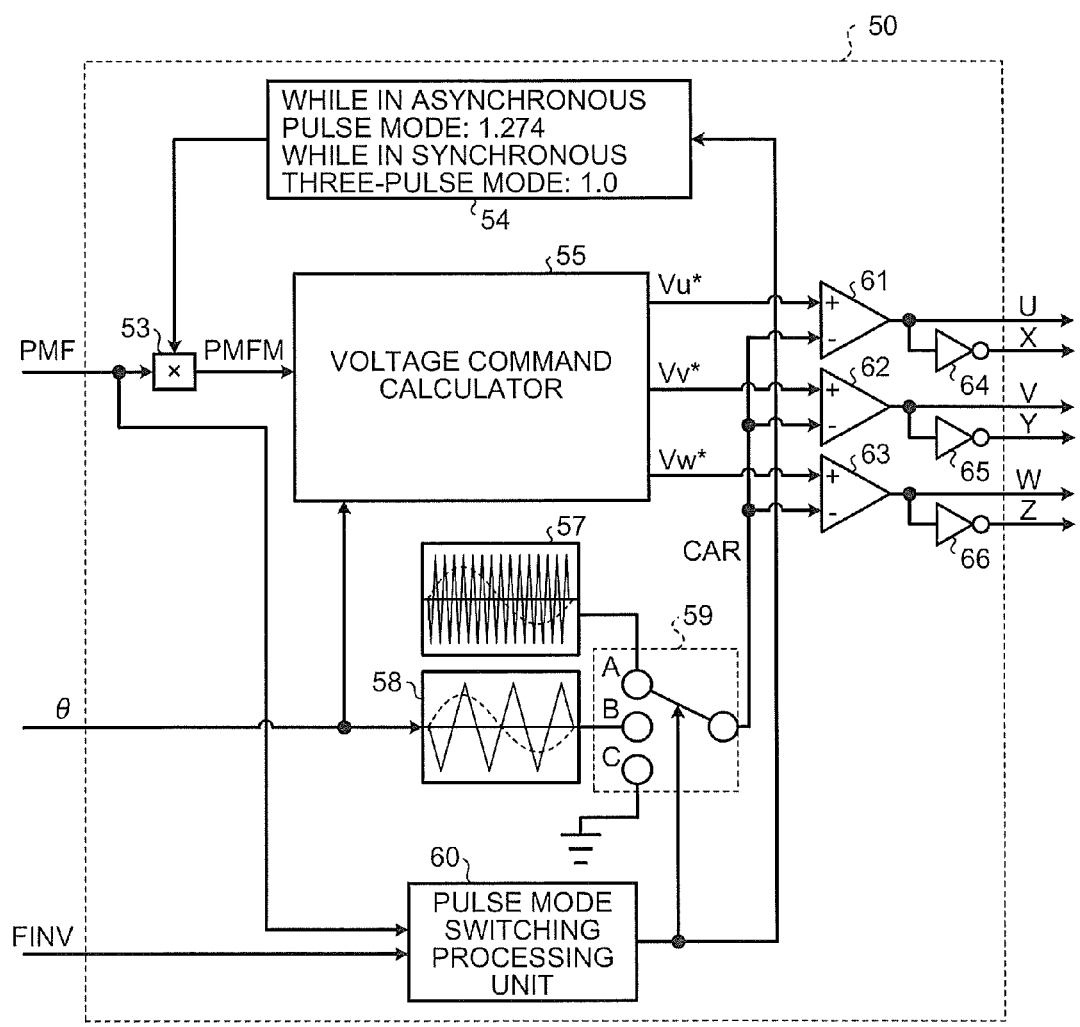
FIG. 2 is a diagram of an example of a voltage command/Pulse Width Modulation (PWM) signal generating unit according to the first embodiment.

Next, a configuration of the voltage command/PWM signal generating unit 50 will be explained. FIG. 2 is a diagram of an example of the voltage command/PWM signal generating unit 50 according to the first embodiment. As shown in FIG. 2, the voltage command/PWM signal generating unit 50 is configured so as to include: a multiplier 53, an adjusted gain table 54, a voltage command calculator 55, an asynchronous carrier signal generating unit 57, a synchronous three-pulse carrier generating unit 58, a switch 59, comparators 61 to 63, and inverting circuits 64 to 66.

The voltage command calculator 55 generates a U-phase voltage command Vu*, a V-phase voltage command Vv*, and a W-phase voltage command Vw* that serve as three-phase voltage commands, based on the modulation factor PMF and the control phase angle θ by using Formulae (13) to (15) shown below:

$$Vu^*=PMFM\cdot\sin\theta \quad (13)$$

$$Vv^*=PMFM\cdot\sin(\theta-(2\cdot\pi/3)) \quad (14)$$

$$Vw^*=PMFM\cdot\sin(\theta-(4\cdot\pi/3)) \quad (15)$$

In Formulae (13) to (15), PMFM represents, as explained below, a voltage command amplitude that is obtained by multiplying the modulation factor PMF by an output of the adjusted gain table 54.

Further, as explained below, a carrier signal CAR that is to be compared with each of the voltage commands described above includes at least a synchronous carrier signal and an asynchronous carrier signal, so that the carrier signal CAR is selectable according to a pulse mode that has been selected by the pulse mode switching processing unit 60 serving as a pulse mode controlling unit. The synchronous carrier signal is obtained by determining the frequency of the carrier signal CAR as a function of the inverter output frequency FINV, in such a manner that the number of pulses and the positions of the pulses structuring the inverter output voltage are equal between a positive-side half cycle and a negative-side half cycle of the inverter output voltage. The asynchronous carrier signal is a signal that is not a synchronous carrier signal and is a carrier signal having a frequency that has been determined irrelevantly to the inverter output frequency FINV. For example, the asynchronous carrier signal is a carrier signal having a frequency of 100 hertz, which is a limit switching frequency for a switching element used for a railway electric car. Also, according to the first embodiment, an example is explained in which, as the synchronous carrier signal, a synchronous three-pulse carrier signal in which three voltage pulses are included in a half cycle of the inverter output voltage is used; however, the present invention is not limited to this example. For example, other signals such as a synchronous five-pulse carrier signal may be used as the synchronous carrier signal. Yet another arrangement is acceptable in which a plurality of synchronous carrier signals are prepared so that the synchronous carrier signal being used is switched among the plurality of synchronous carrier signals, as necessary.

As explained above, the coefficient PMFM used in Formulae (13) to (15) is the voltage command amplitude that is obtained by the multiplier 53 by multiplying the modulation factor PMF by the output of the adjusted gain table 54. The adjusted gain table 54 is used for correcting the relationship between the inverter output voltage VM and the modulation factor PMF that changes depending on whether the asynchronous pulse mode or the synchronous three-pulse mode is used. The outline of the adjusted gain table 54 is explained below.

In the asynchronous pulse mode, the maximum voltage (i.e., an effective value) that is outputtable by the inverter without distortions is 0.612·EFC. In contrast, in the synchronous three-pulse mode, the maximum voltage is 0.7797·EFC. In other words, for the same modulation factor PMF, the ratio of the inverter output voltage in the asynchronous pulse mode to the inverter output voltage in the synchronous three-pulse mode is 1/1.274. To negate the difference between the two, in the asynchronous pulse mode, the modulation factor PMF is multiplied by 1.274, so that the result can be input as the voltage command amplitude PMFM to the voltage command calculator 55 described above. In contrast, in the synchronous pulse mode, the modulation factor PMF is multiplied by 1.0, so that the result can be input as the voltage command amplitude PMFM to the voltage command calculator 55 described above.

Subsequently, the U-phase voltage command Vu*, the V-phase voltage command Vv*, and the W-phase voltage command Vw* that have been output by the voltage command calculator 55 are compared with the carrier signal CAR by the comparators 61 to 63, respectively, so as to determine which is larger. Further, the gate signals U, V, W, which are the results of the comparing processes, as well as the gate signals X, Y, and Z, which are obtained by further putting the comparison results through the inverting circuits 64 to 66, are generated. The carrier signal CAR is a signal which the switch 59 has been caused by the pulse mode switching processing unit 60 to select among from an asynchronous carrier signal A (which is, in the present example, a carrier signal that usually has a frequency of approximately 1000 hertz at maximum) that has been generated by the asynchronous carrier signal generating unit 57, a synchronous three-pulse carrier signal B that has been generated by the synchronous three-pulse carrier signal generating unit 58, and a zero value C that is selected with respect to the one-pulse mode. The asynchronous carrier signal A and the synchronous three-pulse carrier signal B each have a value in a range from −1 to 1 centered around zero.

Figure 7:
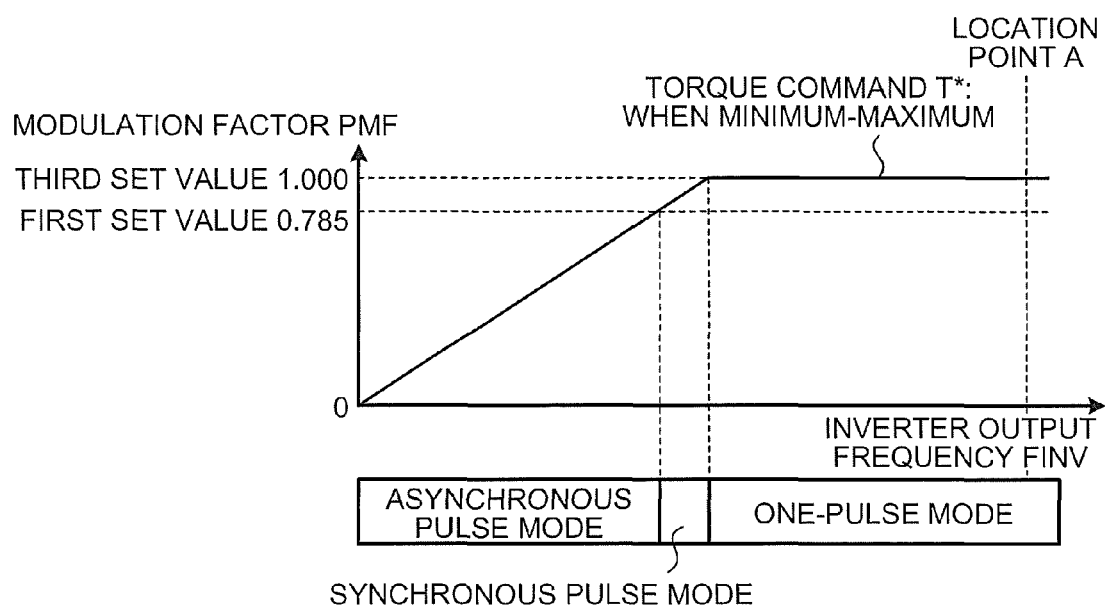
FIG. 7 is a chart for explaining a pulse mode switching operation according to a conventional method.

Next, operations of the pulse mode switching processing unit 60 will be explained. First, as a conventional example, a method that is applied to a motor controlling device that drives and controls an induction motor will be explained. FIG. 7 is a chart for explaining a pulse mode switching operation according to the conventional method. As shown in FIG. 7, the pulse mode is switched among the asynchronous pulse mode, the synchronous pulse mode (e.g., the synchronous three-pulse mode), and the one-pulse mode according to the modulation factor PMF. More specifically, the switch 59 is switched so as to select the asynchronous carrier A side in a range where the modulation factor PMF is small (i.e., the modulation factor PMF is equal to or smaller than a first set value), so as to select the synchronous three-pulse carrier B side when the modulation factor PMF is equal to or larger the first set value but is smaller than a third set value, and so as to select the zero value C side when the modulation factor PMF has reached the third set value. In the following explanation, an example in which 0.785 (=1/1.274) is used as the first set value, whereas 1.0 is used as the third set value will be discussed.

In this situation, when the pulse mode is in the synchronous three-pulse mode, it is possible to have an output of the voltage of which the modulation factor PMF is equal to or larger than 0.785, which is not outputtable in the asynchronous pulse mode. As additional information, even if a method by which overmodulation occurs in the asynchronous pulse mode, the synchronous five-pulse mode, a synchronous nine-pulse mode, or the like, it is possible to have an output of the voltage that corresponds to the synchronous three-pulse mode. However, in this situation, because the relationship between the modulation factor PMF and the output voltage of the inverter 2 becomes nonlinear, it is necessary to correct the nonlinear relationship, and the configuration therefore becomes more complicated.

In contrast, in the case where the conventional method described above is applied to a motor controlling device that drives and controls a permanent magnet synchronous motor, a problem as described below arises.

Figure 3:
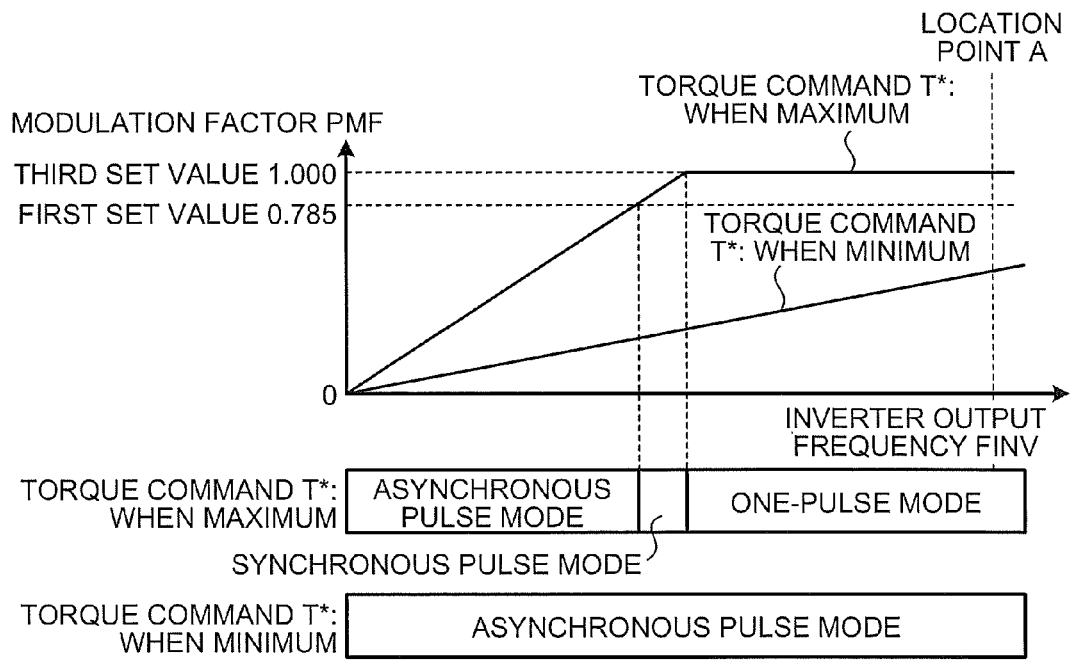
FIG. 3 is a chart for explaining an operation that is performed in a situation where a conventional pulse mode switching method is applied to a motor controlling device that drives and controls a permanent magnet synchronous motor.

FIG. 3 is a chart for explaining an operation that is performed in a situation where the conventional pulse mode switching method is applied to a motor controlling device that drives and controls a permanent magnet synchronous motor. In FIG. 3, pulse modes that are selected according to the relationship between the inverter output frequency FINV and the modulation factor PMF while the torque command T* is used as a parameter are shown. As shown in FIG. 3, the relationship between the modulation factor PMF and the inverter output frequency FINV greatly changes according to the value of the torque command T*. In FIG. 3, let us focus on a situation where, for example, the railway electric car is performing a power running operation and accelerating, with the maximum torque near the maximum speed (at a location point A shown in FIG. 3). In this situation, the maximum value is input as the torque command T* so that the inverter operates in the one-pulse mode in which the maximum output voltage is output. In these circumstances, let us discuss a situation in which an operation is performed so as to decrease the torque command T* to the minimum value for the purpose of, for example, discontinuing the acceleration of the railway electric car and maintaining the speed at a constant level. In this situation, the modulation factor PMF calculated based on the d-axis current command id* and the q-axis current command iq* that have been calculated by the current command generating unit 10 greatly drops from the third set value 1.0, which is the maximum value, as shown in FIG. 3.

In the case where the modulation factor PMF has dropped to a value that is equal to or smaller than 0.785, which is the first set value, the asynchronous pulse mode is selected according to the conventional method. However, because the asynchronous carrier frequency is 1000 hertz at maximum with respect to, for example, an inverter output frequency of 300 hertz, the number of pulses that are included in a half cycle of the inverter output voltage is around 3, which is extremely small. When the motor is driven in such a state, there will be situations in which the carrier frequency is not divisible by the inverter output frequency. In those situations, the number of pulses and the positions of the pulses that are included in a positive half cycle and in a negative half cycle of the inverter output voltage (hereinafter, the "inverter output voltage" refers to a line voltage unless noted otherwise) are imbalanced. As a result, a problem arises where positive/negative symmetricity of the voltage applied to the motor is lost, and noise and/or oscillations are caused due to current oscillations and/or torque ripples occurring in the motor.

To solve the problem described above, the pulse mode switching processing unit 60 according to the first embodiment is configured so as to reference the inverter output frequency FINV itself, which is a quantity related to the inverter output frequency, in addition to the modulation factor PMF, which is a quantity related to the inverter output voltage amplitude and so as to switch the pulse mode based on the modulation factor PMF and the inverter output frequency FINV, according to changes in the level of the output torque T*. With regard to the selection of the quantity related to the inverter output voltage amplitude and the quantity related to the inverter output frequency, the present invention is not limited to the examples that are selected in the first embodiment. It is acceptable to select any quantities in an arbitrary manner, as long as the quantities are functions of the inverter output voltage amplitude and the inverter output frequency, respectively.

Figure 4:
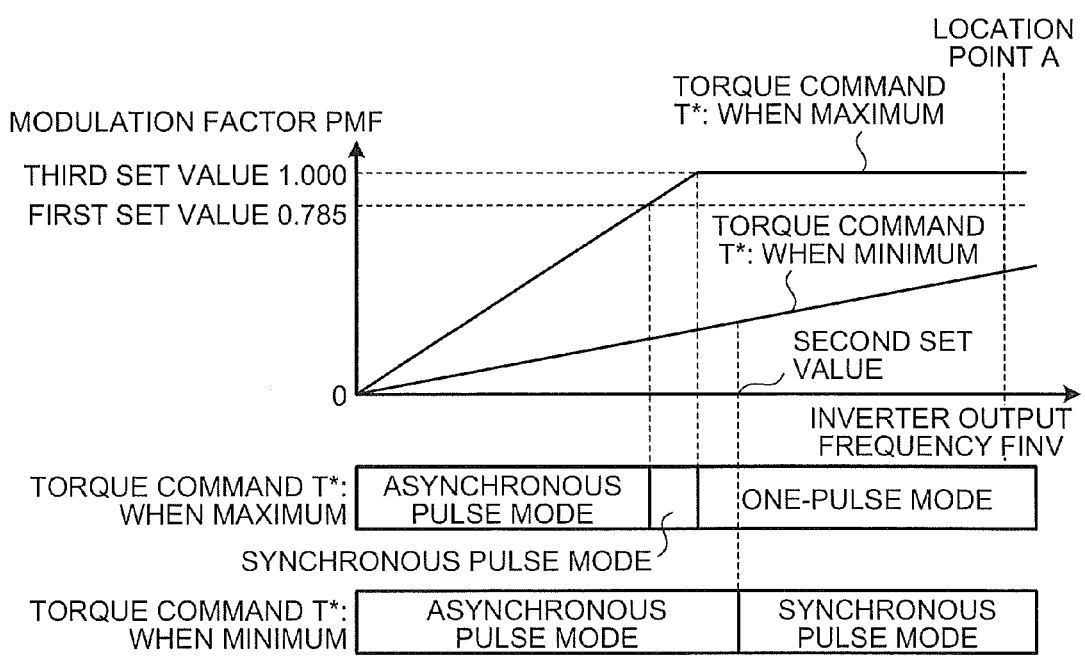
FIG. 4 is a chart for explaining a pulse mode switching operation according to the first embodiment.

FIG. 4 is a chart for explaining a pulse mode switching operation according to the first embodiment. In FIG. 4, pulse modes that are selected according to the relationship between the inverter output frequency FINV and the modulation factor PMF while the torque command T* is used as a parameter are shown. Also, in FIG. 4, in addition to the first set value and the third set value regarding the modulation factor PMF, a second set value regarding the inverter output frequency FINV is shown.

Like the example explained above, let us discuss a situation in which, while the inverter is operating in the one-pulse mode in which the maximum torque is output, an operation is performed so as to decrease the torque command T* to the minimum value for the purpose of, for example, discontinuing an acceleration of the railway electric car and maintaining the speed at a constant level. In this situation, as shown in FIG. 4, at the location point A, the inverter output frequency FINV is referenced, in addition to the modulation factor PMF. In the case where the inverter output frequency FINV is still equal to or higher than the second set value even after the modulation factor PMF has become smaller than the first set value, the asynchronous pulse mode will not be selected, but the pulse mode is maintained in the synchronous pulse mode. In other words, the synchronous pulse mode is switched to the asynchronous pulse mode in the situation where the modulation factor PMF has become smaller than the first set value, and also, the inverter output frequency FINV has become lower than the second set value. Conversely, in the situation where the modulation factor PMF increases starting from zero, even if the modulation factor PMF is smaller than the first set value, as long as the inverter output frequency FINV is equal to or higher than the second set value, the asynchronous pulse mode is switched to the synchronous pulse mode. In other words, the asynchronous pulse mode is switched to the synchronous pulse mode in the situation where the modulation factor PMF has become equal to or larger than the first set value or in the situation where the inverter output frequency FINV has become equal to or higher than the second set value.

To determine the second set value, it is preferable to ensure that the number of pulses included in a half cycle of the inverter output voltage is equal to or larger than a predetermined value. Also, through simulations and the like, we have confirmed that it is preferable to configure the predetermined value so as to be 8 or larger. More specifically, in the case where the number of pulses that are included in a half cycle of the inverter output voltage is approximately 8, even if a situation arises where the carrier frequency is not divisible by the inverter output frequency, the degree of imbalance in the number of pulses and the positions of the pulses between a positive half cycle and a negative half cycle of the inverter output voltage is alleviated. As a result, it is possible to keep the positive/negative symmetricity of the voltage applied to the motor to an extent that causes no problems in practical use. Needless to say, the larger is the number of pulses, the better.

Further, the synchronous pulse mode is switched to the one-pulse mode at a point in time when the modulation factor PMF has become equal to or larger than the third set value. Also, the one-pulse mode is switched to the synchronous pulse mode at a point in time when the modulation factor PMF has become smaller than the third set value.

The operations described above that are performed during the transitions between the synchronous pulse mode and the asynchronous pulse mode according to the first embodiment can be summarized as below.

The asynchronous pulse mode is switched to the synchronous pulse mode under the condition where the modulation factor PMF, which is a quantity related to the inverter output voltage amplitude, has become equal to or larger than the first set value or where the inverter output frequency FINV, which is a quantity related to the inverter output frequency, has become equal to or higher than the second set value. The synchronous pulse mode is switched to the asynchronous pulse mode under the condition where the modulation factor PMF, which is a quantity related to the inverter output voltage amplitude, has become smaller than the first set value, and also, the inverter output frequency FINV, which is a quantity related to the inverter output frequency, has become lower than the second set value. The second set value is determined from the point of view of ensuring that the number of pulses included in a half cycle of an output voltage fundamental wave of the inverter is equal to or larger than the predetermined value. In other words, the second set value is determined based on an applicable frequency of the asynchronous carrier signal and the number of pulses that is required to keep the positive/negative symmetricity of the voltage applied to the motor to an extent that causes no problems in practical use.

According to the first embodiment, in the case where, for example, the second set value is set while ensuring that the number of pulses included in a half cycle of the inverter output voltage is 8, the pulse mode is maintained in the synchronous pulse mode until the inverter output frequency becomes equal to or lower than 125 hertz, which is one eighth of the frequency of the asynchronous carrier signal (i.e., 1000 hertz). As a result, it is possible to configure the number of pulses and the positions of the pulses structuring the inverter output voltage so as to be equal between a positive-side half cycle and a negative-side half cycle of the inverter output voltage. Thus, it is possible to keep the positive/negative symmetricity of the voltage applied to the motor. Consequently, it is possible to obtain a motor controlling device that causes no noise and/or oscillations resulting from current oscillations and/or torque ripples occurring in the motor.

Second Embodiment

As another method for achieving the same advantageous effect as achieved in the first embodiment, it is acceptable to calculate a ratio between, for example, the inverter output frequency FINV and the frequency of the asynchronous carrier signal, i.e., a pulse number index, which is a quantity based on the number of pulses included in a half cycle of the output voltage fundamental wave of the inverter, so that in the case where the pulse number index is larger than a fourth set value, the asynchronous pulse mode is selectable. The pulse number index may be, for example, the number of pulses itself.

Figure 5:
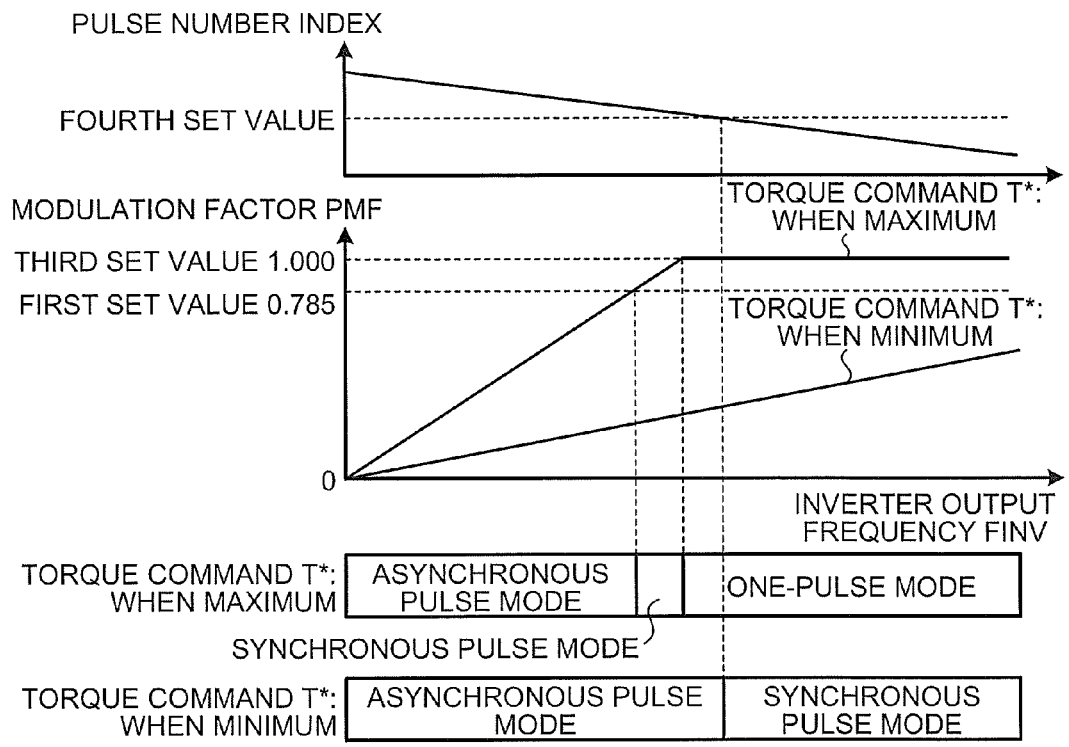
FIG. 5 is a chart for explaining a pulse mode switching operation according to a second embodiment of the present invention.

FIG. 5 is a chart for explaining a pulse mode switching operation according to a second embodiment of the present invention. In FIG. 5, pulse modes that are selected according to the relationship between the inverter output frequency FINV and the modulation factor PMF while the torque command T* is used as a parameter are shown.

In the case where the modulation factor PMF decreases starting from 1.0, even if the modulation factor PMF is smaller than the first set value, as long as the pulse number index is smaller than the fourth set value, the pulse mode will not be switched to the asynchronous pulse mode, but is maintained in the synchronous pulse mode. In other words, the synchronous pulse mode is switched to the asynchronous pulse mode in the situation where the modulation factor PMF is smaller than the first set value, and also, the pulse number index is equal to or larger than the fourth set value.

Conversely, in the case where the modulation factor PMF increases starting from zero, even if the modulation factor PMF is smaller than the first set value, as long as the pulse number index is smaller than the fourth set value, the asynchronous pulse mode is switched to the synchronous pulse mode. In other words, the asynchronous pulse mode is switched to the synchronous pulse mode in the situation where the modulation factor PMF is equal to or larger than the first set value or where the pulse number index is smaller than the fourth set value.

As explained in the description of the first embodiment, the fourth set value is determined based on an applicable frequency of the asynchronous carrier signal and the number of pulses that is required to keep the positive/negative symmetricity of the voltage applied to the motor to an extent that causes no problems in practical use. It is preferable to configure the fourth set value so as to be 8 or larger.

According to the second embodiment, in the case where the fourth set value is set while ensuring that the number of pulses included in a half cycle of the inverter output voltage is, for example, 8 or larger, the pulse mode is maintained in the synchronous pulse mode until the inverter output frequency becomes equal to or lower than 125 hertz, which is one eighth of the frequency of the asynchronous carrier signal (i.e., 1000 hertz). As a result, it is possible to configure the number of pulses and the positions of the pulses structuring the inverter output voltage so as to be equal between a positive-side half cycle and a negative-side half cycle of the inverter output voltage. Thus, it is possible to keep the positive/negative symmetricity of the voltage applied to the motor. Consequently, it is possible to obtain a motor controlling device that causes no noise and/or oscillations resulting from current oscillations and/or torque ripples occurring in the motor. Other configurations, operations, and advantageous effects of the second embodiment are the same as those of the first embodiment.

Third Embodiment

Figure 6:
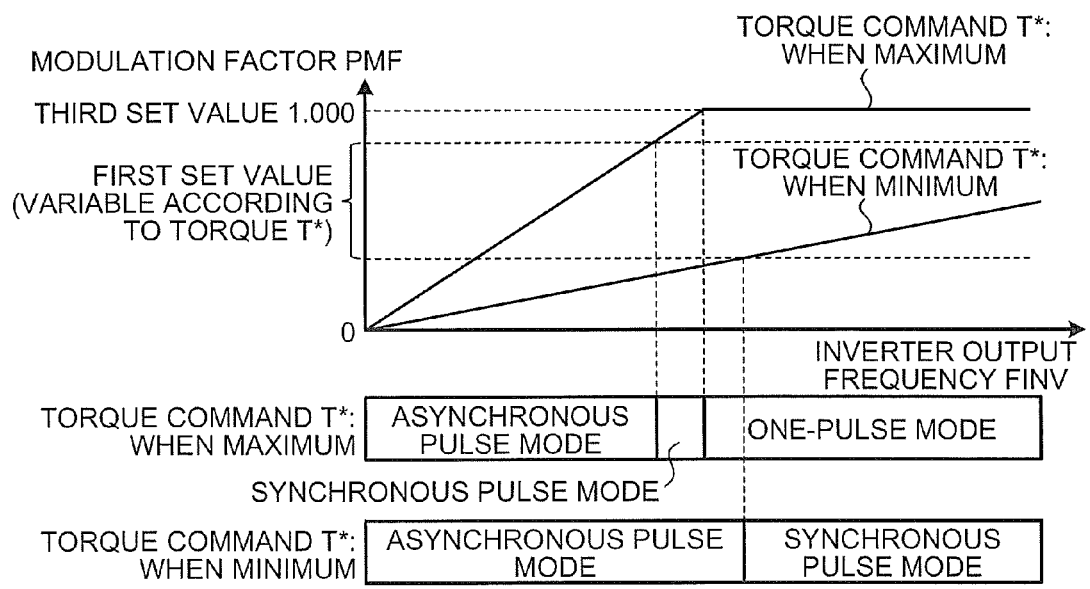
FIG. 6 is a chart for explaining a pulse mode switching operation according to a third embodiment of the present invention.

FIG. 6 is a chart for explaining a pulse mode switching operation according to a third embodiment of the present invention. As shown in FIG. 6, because the modulation factor PMF is a quantity that varies depending on the output torque, it is possible to configure the first set value so as to be variable according to the torque command T*. As shown in FIG. 6, when the torque command T* is large, the first set value is set to a large value, whereas when the torque command T* is small, the first set value is set to a small value. Further, the asynchronous pulse mode is switched to the synchronous pulse mode in the situation where the modulation factor PMF, which is a quantity related to the inverter output voltage amplitude, has become equal to or larger than the first set value that is set according to the torque command T*. In addition, the synchronous pulse mode is switched to the asynchronous pulse mode in the situation where the modulation factor PMF, which is a quantity related to the inverter output voltage amplitude, has become smaller than the first set value that is set according to the torque command T*.

According to this method, there is no need to set the second set value. In addition, according to this method, the inverter output frequency FINV, which includes the rotor mechanical angle Om of the motor and is a quantity that can have a drastic temporal change according to the rotation state of the motor, is not directly referenced. Instead, the torque command T* that has been generated in a feed-forward manner is referenced. As a result, in a situation where the rotation speed of the motor changes in synchronization with, for example, a free-spin and/or skidding of a wheel, which can generally occur with railway electric cars, so that the inverter output frequency FINV consequently fluctuates in the manner of oscillations going above and below the second set value, it is possible to avoid a situation in which the pulse mode is switched between the asynchronous pulse mode and the synchronous pulse mode in the manner of a chattering phenomenon.

Needless to say, to determine the first set value, which is a variable value, it is preferable to ensure that the number of pulses included in a half cycle of the inverter output voltage is equal to or larger than the predetermined value (e.g., 8 or larger), as explained in the description of the first embodiment.

According to the third embodiment, it is possible to keep the positive/negative symmetricity of the voltage applied to the motor. Consequently, it is possible to obtain a motor controlling device that causes no noise and/or oscillations resulting from current oscillations and/or torque ripples occurring in the motor. In addition, in the case where the inverter output frequency FINV fluctuates near the second set value going above and below the value, it is possible to avoid the situation in which the pulse mode is switched between the asynchronous pulse mode and the synchronous pulse mode in the manner of a chattering phenomenon. Other configurations, operations, and advantageous effects of the third embodiment are the same as those of the first embodiment.

As explained above, according to the first through the third embodiments, the pulse mode is switched based on two quantities each of which is related to the output state of the inverter. In other words, the pulse mode is switched, based on the modulation factor PMF and the inverter output frequency FINV according to the first embodiment, based on the modulation factor PMF and the pulse number index according to the second embodiment, and based on the modulation factor PMF and the torque command T* according to the third embodiment. In contrast, according to the conventional controlling method as shown in FIG. 7, the pulse mode is switched based only on the modulation factor PMF. In the case where such a conventional controlling method is applied to a motor in which the modulation factor PMF greatly changes according to the level of the torque command T*, the problem arises where current oscillations and/or torque ripples occur. According to the first through the third embodiments, however, because the quantity related to the output state of the inverter is used in addition to the modulation factor, it is possible to address the changes in the level of the modulation factor PMF that occur according to the level of the torque command T*. Further, because the two quantities each of which is related to the output state of the inverter are used, it is possible to reference the number of pulses included in the cycle of the output voltage fundamental wave of the inverter. As a result, by appropriately setting the set values used for switching between the synchronous pulse mode and the asynchronous pulse mode based on the number of pulses, it is possible to exercise control while sufficient attention is being paid to the positive/negative symmetricity of the voltage applied to the motor.

Fourth Embodiment

Next, an operation that is performed when the inverter 2 is turned off for the purpose of discontinuing a power-running operation or a regenerative operation during travel of a railway electric car will be explained.

Let us discuss a situation in which, while the inverter 2 is operating in the one-pulse mode, an OFF command (not shown) instructing that the power-running operation or the regenerative operation of the railway electric car should be turned off has been input to the motor controlling device 100 from an external controlling device (not shown). In this situation, the external controlling device gradually decreases the torque command T* toward zero, at the same time. The torque command T* drops from the maximum value to zero in approximately one second. In this situation, the motor controlling device 100 executes controlling steps described below.

At the point in time when the modulation factor PMF has become smaller than 1.0 due to the decrease of the torque command T*, the pulse mode switching processing unit 60 switches the pulse mode from the one-pulse mode to the synchronous pulse mode. After that, even if the modulation factor PMF has become smaller than the first set value, the pulse mode switching processing unit 60 does not switch the pulse mode to the asynchronous pulse mode, but reduces the modulation factor PMF while maintaining the pulse mode in the synchronous pulse mode. After the torque command T* has sufficiently been decreased, all of the gate signals U, V, W, X, Y, and Z provided for the inverter 2 are turned off.

As an example of another situation, let us discuss a situation in which, while the inverter 2 is operating in the synchronous pulse mode, an OFF command (not shown) instructing that a power-running operation or a regenerative operation of the railway electric car should be turned off has been input to the motor controlling device 100 from an external controlling device. In this situation, the external controlling device gradually decreases the torque command T* toward zero, at the same time. The torque command T* drops from the maximum value to zero in approximately one second. In this situation, the motor controlling device 100 executes controlling steps described below.

Even if the modulation factor PMF has become smaller than the first set value due to the decrease of the torque command T*, the pulse mode switching processing unit 60 does not switch the pulse mode to the asynchronous pulse mode, but reduces the modulation factor PMF while maintaining the pulse mode in the synchronous pulse mode. After the torque command T* has sufficiently been decreased, all of the gate signals U, V, W, X, Y, and Z provided for the inverter 2 are turned off.

As explained above, according to the fourth embodiment, in the case where the inverter 2 is stopped for the purpose of discontinuing a power-running operation or a regenerative operation of a railway electric car while the inverter 2 is operating in the one-pulse mode or in the synchronous pulse mode, the pulse mode switching processing unit 60 is configured so as to maintain the pulse mode in the synchronous pulse mode so that the asynchronous pulse mode will not be selected. As a result, even in the situation where the inverter 2 is turned off while the inverter output frequency is in a high range, it is possible to configure the number of pulses and the positions of the pulses structuring the inverter output voltage so as to be equal between a positive-side half cycle and a negative-side half cycle of the inverter output voltage. Thus, it is possible to keep the positive/negative symmetricity of the voltage applied to the motor. Consequently, it is possible to obtain a motor controlling device that is able to stop the inverter 2 without fail in a stable manner, without causing any current oscillations or torque ripples in the motor. Further, because the pulse mode switching processing unit 60 is configured so as not to select the asynchronous pulse mode, it is possible to avoid the situation in which the pulse mode is switched a plurality of times in a short period of time (i.e., approximately one second) before the torque command T* is decreased to zero. Consequently, it is possible to avoid instability of control caused by, for example, delays in the switching timing.

Fifth Embodiment

Next, an operation that is performed to start up the inverter 2 for the purpose of starting a power-running operation or a regenerative operation of a railway electric car in the situation where the railway electric car is coasting while the inverter output frequency FINV, which is a quantity related to the inverter output frequency, is equal to or higher than the second set value will be explained.

Let us discuss a situation in which, while the inverter 2 is stopped, a startup command (not shown) instructing that a power-running operation or a regenerative operation of the railway electric car should be started has been input to the motor controlling device 100 from an external controlling device (not shown). In this situation, the external controlling device gradually raises the torque command T* to a predetermined value at the same time. The torque command T* can be raised from zero to the predetermined value in approximately one second. In this situation, the motor controlling device 100 executes controlling steps described below.

The switching process with the gate signals U, V, W, X, Y, and Z provided for the inverter 2 is started due to the startup command, but even if the modulation factor PMF is smaller than the first set value, the pulse mode switching processing unit 60 starts the operation while using the synchronous pulse mode as an initial setting of the pulse mode, regardless of the modulation factor PMF being smaller than the first set value. After that, at a point in time when the modulation factor PMF has increased so as to become equal to or larger than 1.0, the pulse mode switching processing unit 60 switches the pulse mode to the one-pulse mode. Alternatively, at a point in time when the modulation factor PMF has decreased so as to become smaller than the first set value, and also, the inverter output frequency FINV has become lower than the second set value, the pulse mode switching processing unit 60 switches the pulse mode to the asynchronous pulse mode.

As explained above, according to a fifth embodiment of the present invention, in the situation where the inverter 2 is started up in such a state where the railway electric car is coasting while the inverter output frequency FINV, which is a quantity related to the inverter output frequency, is equal to or higher than the second set value, the pulse mode switching processing unit 60 starts the operation while using the synchronous pulse mode as the initial setting of the pulse mode so that the asynchronous pulse mode will not be selected. As a result, even in the situation where the inverter 2 is started up while the inverter output frequency is in a high range, it is possible to configure, from the point in time immediately after the startup, the number of pulses and the positions of the pulses structuring the inverter output voltage so as to be equal between a positive-side half cycle and a negative-side half cycle of the inverter output voltage. Thus, it is possible to keep the positive/negative symmetricity of the voltage applied to the motor. Consequently, it is possible to obtain a motor controlling device that is able to start up the inverter 2 without fail in a stable manner, without causing any current oscillations or torque ripples in the motor.

In some portions of the description of the first through the fifth embodiments above, the present invention is explained while using the situation where the railway electric car is performing a power running operation as an example. However, even in a situation where a railway electric car is lowering the speed while using a regenerative brake, it is possible to apply the present invention based on the same idea.

Further, the present invention has been explained while using the motor controlling device that controls the permanent magnet synchronous motor as an example. However, it is possible to apply the present invention to a motor controlling device that drives and controls other types of motors. Furthermore, although the present invention has been explained while using the configuration with the three-phase alternating current as an example, it is possible to apply the present invention to other configurations.

The configurations that are described in the exemplary embodiments above are examples of the present invention. Needless to say, it is possible to combine the present invention with other publicly-known techniques. It is also possible to apply modifications to the present invention by, for example, omitting one or more parts thereof, without departing from the gist of the present invention.

Furthermore, in the present description, the present invention is explained while assuming that the present invention is applied to a motor controlling device used for driving a railway electric car. However, the fields to which the present invention can be applied are not limited to this example. Needless to say, it is possible to apply the present invention to other various related fields such as electric automobiles, elevators, and the like.

INDUSTRIAL APPLICABILITY

As explained above, the motor controlling device according to an aspect of the present invention is useful as a motor controlling device that controls a permanent magnet synchronous motor.

The invention claimed is:

1. A motor controlling device that controls an alternating-current motor by outputting a pulse width modulation signal to a switching element included in an inverter that is connected to a direct-current power source and is operable to output an alternating current having an arbitrary frequency and an arbitrary voltage to the alternating-current motor, the motor controlling device comprising:
a pulse mode controlling unit that is operable to selectively switch among a plurality of pulse modes each of which can serve as an output pattern of the pulse width modulation signal, the plurality of pulse modes including a synchronous pulse mode, an asynchronous pulse mode, and a one-pulse mode, wherein
the pulse mode controlling unit switches between the synchronous pulse mode and the asynchronous pulse mode based on a quantity related to an output voltage amplitude of the inverter and a quantity related to an output frequency of the inverter,
the pulse mode controlling unit switches from the asynchronous pulse mode to the synchronous pulse mode in a situation where the quantity related to the output voltage amplitude of the inverter has become equal to or larger than a first set value or in a situation where the quantity related to the output frequency of the inverter has become equal to or larger than a second set value, and
the pulse mode controlling unit switches from the synchronous pulse mode to the asynchronous pulse mode in a situation where the quantity related to the output voltage amplitude of the inverter has become smaller than the first set value, and also, the quantity related to the output frequency of the inverter has become smaller than the second set value.

2. The motor controlling device according to claim 1, wherein
the pulse mode controlling unit switches from the synchronous pulse mode to the one-pulse mode in a situation where the quantity related to the output voltage amplitude of the inverter has become equal to or larger than a third set value that is larger than the first set value, and
the pulse mode controlling unit switches from the one-pulse mode to the synchronous pulse mode in a situation where the quantity related to the output voltage amplitude of the inverter has become smaller than the third set value.

3. The motor controlling device according to claim 1, wherein the second set value is set so that a number indicating how many pulses are included in a half cycle of an output voltage fundamental wave of the inverter is 8 or larger.

4. The motor controlling device according to claim 2, wherein the second set value is set so that a number indicating how many pulses are included in a half cycle of an output voltage fundamental wave of the inverter is 8 or larger.

5. The motor controlling device according to claim 1, wherein
the motor controlling device is installed in a railway electric car, and
to start up the inverter that is stopped while the railway electric car is coasting in a situation where the quantity related to the output frequency of the inverter is equal to or larger than the second set value, the motor controlling device executes a controlling step of using the synchronous pulse mode as an initial setting of the pulse modes.

6. A motor controlling device that controls an alternating-current motor by outputting a pulse width modulation signal to a switching element included in an inverter that is connected to a direct-current power source and is operable to output an alternating current having an arbitrary frequency and an arbitrary voltage to the alternating-current motor, the motor controlling device comprising:
a pulse mode controlling unit that is operable to selectively switch among a plurality of pulse modes each of which can serve as an output pattern of the pulse width modulation signal, the plurality of pulse modes including a synchronous pulse mode, an asynchronous pulse mode, and a one-pulse mode, wherein
the pulse mode controlling unit switches between the synchronous pulse mode and the asynchronous pulse mode based on a quantity related to an output voltage amplitude of the inverter and a quantity based on a number indicating how many pulses are included in a half cycle of an output voltage fundamental wave of the inverter,
the pulse mode controlling unit switches from the asynchronous pulse mode to the synchronous pulse mode in a situation where the quantity related to the output voltage amplitude of the inverter has become equal to or larger than a first set value or in a situation where the quantity based on the number indicating how many pulses are included has become smaller than a second set value, and
the pulse mode controlling unit switches from the synchronous pulse mode to the asynchronous pulse mode in a situation where the quantity related to the output voltage amplitude of the inverter has become smaller than the first set value, and also, the quantity based on the number indicating how many pulses are included has become equal to or larger than the second set value.

7. The motor controlling device according to claim 6, wherein
the quantity based on the number indicating how many pulses are included is the number itself indicating how many pulses are included in the half cycle of the output voltage fundamental wave of the inverter, and
the second set value is 8 or larger.

8. A motor controlling device that controls an alternating-current motor by outputting a pulse width modulation signal to a switching element included in an inverter that is connected to a direct-current power source and is operable to output an alternating current having an arbitrary frequency and an arbitrary voltage to the alternating-current motor, the motor controlling device comprising:
a pulse mode controlling unit that is operable to selectively switch among a plurality of pulse modes each of which can serve as an output pattern of the pulse width modulation signal, the plurality of pulse modes including a synchronous pulse mode, an asynchronous pulse mode, and a one-pulse mode, wherein the pulse mode controlling unit switches between the synchronous pulse mode and the asynchronous pulse mode based on a quantity related to an output voltage amplitude of the inverter and a torque or a torque command that is output by the alternating-current motor.

9. The motor controlling device according to claim 8, wherein the pulse mode controlling unit switches from the asynchronous pulse mode to the synchronous pulse mode in a situation where the quantity related to the output voltage amplitude of the inverter has become equal to or larger than a first set value that is set according to the torque that is output by the alternating-current motor, and the pulse mode controlling unit switches from the synchronous pulse mode to the asynchronous pulse mode in a situation where the quantity related to the output voltage amplitude of the inverter has become smaller than the first set value that is set according to the torque that is output by the alternating-current motor.

10. The motor controlling device according to claim 9, wherein the first set value is set to a large value when the torque that is output by the alternating-current motor is large, whereas the first set value is set to a small value when the torque that is output by the alternating-current motor is small.

11. The motor controlling device according to claim 10, wherein the first set value is set so that a number indicating how many pulses are included in a half cycle of the output voltage fundamental wave of the inverter is equal to or larger than a predetermined value.

12. The motor controlling device according to claim 11, wherein the predetermined value is 8.

13. A motor controlling device that controls an alternating-current motor by outputting a pulse width modulation signal to a switching element included in an inverter that is connected to a direct-current power source and is operable to output an alternating current having an arbitrary frequency and an arbitrary voltage to the alternating-current motor, the motor controlling device comprising:

a pulse mode controlling unit that is operable to selectively switch among a plurality of pulse modes each of which can serve as an output pattern of the pulse width modulation signal, the plurality of pulse modes including a synchronous pulse mode, an asynchronous pulse mode, and a one-pulse mode, wherein to stop the inverter while the inverter is operating in the one-pulse mode, the motor controlling device executes controlling steps in an order of: the one-pulse mode, the synchronous pulse mode, and an inverter gate-off process.

14. The motor controlling device according to claim 13, wherein, to stop the inverter while the inverter is operating in the synchronous pulse mode, the motor controlling device executes controlling steps in an order of: the synchronous pulse mode and the inverter gate-off process.

* * * * *